(12) United States Patent
Dytrych

(10) Patent No.: US 7,716,456 B2
(45) Date of Patent: May 11, 2010

(54) MEMORY-EFFICIENT INSTRUCTION PROCESSING SCHEME

(75) Inventor: Peter Dytrych, Leuven (BE)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 10/583,052

(22) PCT Filed: Nov. 30, 2004

(86) PCT No.: PCT/IB2004/052595

§ 371 (c)(1),
(2), (4) Date: Jun. 14, 2006

(87) PCT Pub. No.: WO2005/059738

PCT Pub. Date: Jun. 30, 2005

(65) Prior Publication Data
US 2007/0162724 A1  Jul. 12, 2007

(30) Foreign Application Priority Data
Dec. 16, 2003 (EP) .................................. 03104704

(51) Int. Cl.
*G06F 7/38* (2006.01)
*G06F 9/00* (2006.01)
*G06F 9/44* (2006.01)
*G06F 15/00* (2006.01)
(52) U.S. Cl. ..................................................... 712/220
(58) Field of Classification Search .................. 712/220
See application file for complete search history.

(56) References Cited

U.S. PATENT DOCUMENTS

| 5,930,508 | A | * | 7/1999 | Faraboschi et al. | .......... 717/158 |
| 6,154,828 | A | | 11/2000 | Marci et al. | |
| 6,275,921 | B1 | * | 8/2001 | Iwata et al. | ................... 712/24 |
| 6,499,096 | B1 | * | 12/2002 | Suzuki | ........................ 712/24 |
| 2001/0047466 | A1 | * | 11/2001 | Topham | ...................... 712/226 |

FOREIGN PATENT DOCUMENTS

| EP | 1046983 A1 * | 10/2000 |
| EP | 1 158 401 | 11/2001 |

* cited by examiner

*Primary Examiner*—Eddie P Chan
*Assistant Examiner*—Corey Faherty

(57) ABSTRACT

In a two-dimensional optical storage (TwoDOS) arrangement, at certain places on the optical disc, calibration pits are placed, for instance in the lead-in and/or additionally sparsely in the data. The signal waveform resulting from the read out of the calibration bits is measured, and matrix multiplication is performed on these signals to obtain the linear interference coefficients. This can be done since the bit sequence is known (along all of the bit-rows of the 2D patterns). From these linear interference coefficients, the electric field distribution of the read-out spots at the pitholes can be reconstructed. This information can be used in at least two ways: The signal processing unit can use this as input for its settings, so it uses a measured response of the optical channel instead of an expected response.

14 Claims, 4 Drawing Sheets

MEMORY-EFFICIENT INSTRUCTION PROCESSING SCHEME

The present invention relates to a parallel processing apparatus, such as a very long instruction word (VLIW) processor, to memory-efficient methods of compressing and decompressing instruction words of such a parallel processing apparatus, and to a computer program product for enabling a computer to carry out the steps of the memory-efficient methods when loaded into the computer.

Parallel processors, e.g. VLIW processors, may be used in a variety of applications ranging from super computers to work stations and personal computers. They may be used as dedicated or programmable processors in work stations, personal computers and video or audio consumer products. They may be application specific processors, i.e. they may be designed to process specific applications in order to enhance the performance of these applications. To this end special functional units are incorporated in a VLIW processor. Each functional unit is designed to process a particular operation depending on the application to be processed. The set of instructions to be executed by the VLIW processor contains the scheduled operations.

While a functional unit is performing an operation, further operations may not be scheduled on said functional unit if the functional unit is un-pipelined. A new operation can be scheduled by the compiler after a fixed number of cycles corresponding to the initiation interval of the functional unit if it is pipelined. After a functional unit has finished processing, the processing results must be further processed or output from the VLIW processor. The compiler generating the set of instructions needs to know the initiation interval and latency of the functional units at compile time in order to schedule the operations of these units. The initiation interval of a functional unit is the time interval after which a new operation can be initiated on it. The latency of a functional unit is the time it takes for the functional unit to perform its operation. Based on worst-case latencies for scheduling the operations of functional units in a VLIW processor, the compiler has to introduce NOPs (no operation instructions) in the schedule.

Unfortunately, the degree of Instruction Level Parallelism (ILP) in CPU (Central Processing Unit) present in most applications is limited, leading to a lot of expensive program memory resource being used simply to describe NOPs for many of the CPU's functional unit.

Documents U.S. Pat. No. 6,154,828 and EP 1158401A2 disclose instruction compression and decompression schemes which however require specific pipelines, registers or memory sections for re-aligning and/or expanding instruction words issued down the pipeline to the instruction decoder.

It is an object of the present invention to reduce the required amount of program memory without introducing any extra memory requirements or pipelines.

This object is achieved by a parallel processing apparatus as claimed in claim 1, a decompression method as claimed in claim 11, a compression method as claimed in claim 12, and a computer program product as claimed in claim 13.

Accordingly, individual instructions extracted from subsequent instruction words are combined in a new single instruction word of the same general instruction format. This leads to a reduced amount of program memory without using any additional pipeline stages or memory sections. Delay instructions or delay slots can thus be removed from the instruction words before storing them in a program memory. The instruction format can then be handled directly by the instruction pipeline by re-incorporating the missing delay instructions.

In addition to the reduced amount of program memory, the required memory access bandwidth can be reduced due to the decreased amount of instructions stored. The proposed compression technique can be achieved at low hardware complexity and high cycle efficiency.

The instruction processing can be adapted to extract said first and at least second individual instructions if said first and at least second instruction words each comprise one of predetermined instruction patterns with at least one delay instruction, and to compress said first and at least second instruction words into said single instruction word. Particularly, the delay instruction may be a null operation or NOP. Thereby, common simple patterns of individual instructions are grouped in a predetermined manner and aligned exactly with physical program memory words. This is highly beneficial in terms of memory usage and complexity.

Furthermore, during or after compression, the instruction processing may be adapted to add a predetermined control information to said single instruction word, said control information indicating at least one of an allocation of said extracted first and at least second individual instructions to said respective functional units and a sequential order of said first and least second individual instructions at their respective functional units. This control information may consist of at least one bit added as at least one respective most significant bit to said single instruction word. Each new single instruction word can thus be decompressed or expanded individually without requiring additional memory space for storing original memory addresses or sequences of the compressed individual instructions.

During or before expansion or decompression, the instruction processing may be adapted to check the control information in an instruction word read from a program memory, to re-establish said first and at least instruction words based on said control information, and to supply said re-established first and at least second instruction words to an instruction decoder. Hence, at each program memory fetch, the individual instructions or control words can be issued in a correct manner to the instruction decoder.

The instruction processing may be adapted to mark all instruction words associated with delay slots and branch targets, and to decide on extraction of said first and at least second individual instructions based on the markings. Then, at least one program memory address may be adjusted based on a decided extraction. The proposed technique is thus transparent to users of code generation applications and all stages can be processed automatically.

Other advantageous modifications are defined in the dependent claims.

Embodiments of the present invention will now be described with reference to the accompanied drawings, in which.

Figure 1:
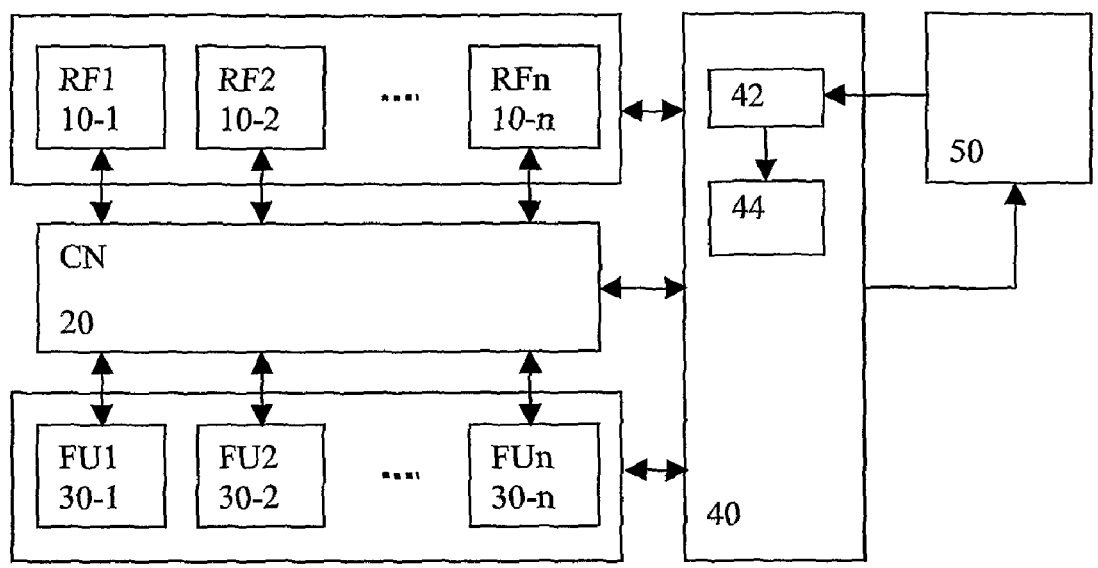
FIG. 1 shows a schematic architecture of a VLIW processor in which the present invention can be implemented.

FIG. 1 depicts the VLIW processor according to the embodiments of the present invention. The VLIW processor comprises a VLIW controller 40 that is connected to a number of functional units 30-1 to 30-n. The VLIW controller 40 issues in particular the operation or individual instruction of the functional units 30-1 to 30-n. An interconnection network 20 connects the functional units 30-1 to 30-n directly in order to facilitate data transfer between these functional units. A global register file with individual register files 10-1 to 10-n stores values produced by the functional units 30-1 to 30-n. The purpose of the global register files is to provide a way of communicating data produced by one of the functional units 30-1 to 30-n to the other functional units 30-1 to 30-n. The functional units 30-1 to 30-n may encompass at least one of standard arithmetic and logical units, constant generating units, memory units for data and an instruction memory, and the like. These units may be used in a large number of applications.

The communication network 20 connects output ports of the functional units 30-1 to 30-n to input ports of the register files 10-1 to 10-n and input ports of the functional units 30-1 to 30-n to output ports of the register files 10-1 to 10-n under control of a sequencer function provided in the controller 40. In particular, an instruction decoder 44 of the controller 40 obtains instruction words from an instruction register 42 of the controller 40. In every cycle, the instruction register 42 is loaded with a new instruction word. This instruction word contains information required to generate for every data path component control information that is valid in one cycle. Depending on the used instruction encoding concept, the instruction word controls data path components simultaneously, that is in the same cycle, or in different cycles. In any case, with more than one functional unit, as in the present architecture, an instruction word can imply execution of several parallel operations. The program with the sequence of instruction words is stored in a program memory 50.

According to the embodiments, an instruction processing scheme is proposed for producing the amount of program memory needed to describe delay instructions, e.g. NOPs, without using extra pipeline stages. In particular, a compression or compaction scheme is proposed which leads to a more efficient solution specially suited for low power processing units due to the fact that low hardware complexity is involved and high cycle efficiency is achieved. As an example, savings around 25% of program memory space can be achieved with a general compiled C code.

In a program code scheduled for example for a digital signal processing, many program segments have pure memory load or store operations defined with no arithmetic operations, e.g., stack frame manipulation on entry or exit from a function. These memory operations are associated with a single functional unit, e.g., a load store unit. In the following, an exemplary sequence of instruction patterns comprising two individual instructions is shown, which however may apply to any functional unit and not just to a load store unit:

NOP||mem1
NOP||mem2
. . .
. . .
NOP||memN

According to the first preferred embodiment, a new instruction format is defined which has two sequential memory operations within it, e.g.:

mem1||mem2 wherein information indicating this new instruction format can be inserted anywhere within the instruction set graph, e.g. at the top level. For example, in a machine with a single format 32 bit ISA (Instruction Set Architecture) the new format can be indicated by an extra bit located at the most significant bit (MSB) position.

Thus, with such a format bit added at the MSB position of the 32-bit instruction word and used to distinguish or code the original and sequential formats, the bit sequence can be expressed as follows:

"0"<32> original ISA
"1"<32> sequential extension

This new instruction format is then treated by the instruction pipeline as if the original instruction sequence with NOP instructions was issued, by expanding or adding the missing arithmetic NOPs. Due to the fact that the proposed technique simply involves an expansion of an aligned program memory access, no extra pipelines stages or memory sections are needed and cycle efficiency is maintained.

Figure 2:
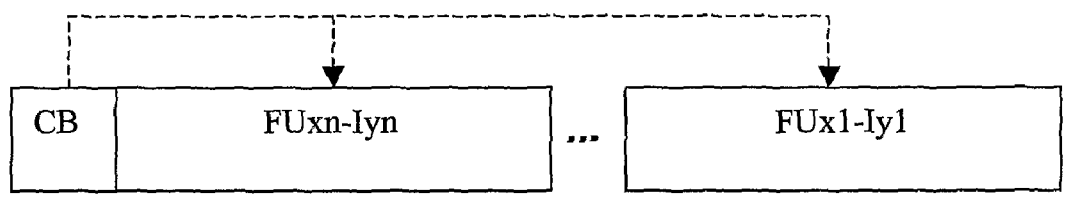
FIG. 2 shows a schematic representation of a compressed instruction word according to the preferred embodiments.

FIG. 2 shows a general scheme for an instruction word with a control information CB according to the preferred embodiments. Each program word or instruction word is expanded by a predetermined number of bits corresponding to the control information CB which indicates the instruction format defining e.g. allocation and sequential order of individual instructions FUx1-Iy1 to FUxn-Iyn. The new expanded instruction width is also allocated to the physical program memory 50.

In the conventional instruction format, the position of an individual instruction within the instruction word was fixedly allocated to a corresponding one of the functional units 30-1 to 30-n and to the prevailing instruction cycle. The new instruction format allows incorporating individual instructions of different cycles and/or of different functional units within a single instruction word. Therefore, in case of a 32-bit instruction word with two individual instructions according to the first preferred embodiment, the conventional pattern sequence:

NOP||FU1 //instruction 1
NOP||FU1 //instruction 2 can be compressed or compacted into a new single instruction word:

"1"<FU1 instruction 1><FU1 instruction 2>="1"<FU1-I1><FU1-I2> wherein "FU" indicates a functional unit, and "I" indicates an instruction index used for designating the sequential order of the instruction at the concerned functional unit. As an example, "FU1" can be a memory load store unit or in general one of the functional units 30-1 to 30-n provided in the VLIW processor.

In a more general sense, this instruction processing technique can be applied to compress any set of instruction patterns that include some NOPs or other non-operative delay instructions. The coding efficiency is driven purely by the statistics of occurrences of instruction patterns, wherein any combination of functional unit and instruction can be coded that fits within a physical program memory word. As an efficient example, simple common patterns, such as "NOP ||mem" can be detected and combined to remove the NOP instructions.

According to a second preferred embodiment, the instruction word may comprise triples of individual instructions. In this case, the control information CB may be a two bit information so as to distinguish four different combinations of instruction allocations and sequential orders, e.g. as defined in the following:

```
"00"<FU3-I1><FU2-I1><FU1-I1>        // parallel format
"01"<FU1-I1> <FU1-I2> <FU1-I3>
// three compressed NOP||NOP||FU1 triples
"10"<FU2-I1><FU2-I2><FU2-I3>
// three compressed NOP||FU2||NOP triples
"11"<FU3-I1><FU2-I2><FU1-I2>
// compr. FU3||NOP||NOP, NOP||FU2||FU1 pairs
```

Thereby, NOP instructions do not have to be stored in the program memory 50 due to the fact that predetermined patterns comprising NOP instruction(s) are detected, and a predetermined number of sequential instruction words comprising the predetermined patterns are replaced by a single instruction word comprising a pattern of non-NOP instructions extracted from the predetermined patterns. These compressed instruction words are then stored in the program memory 50.

Figure 3:
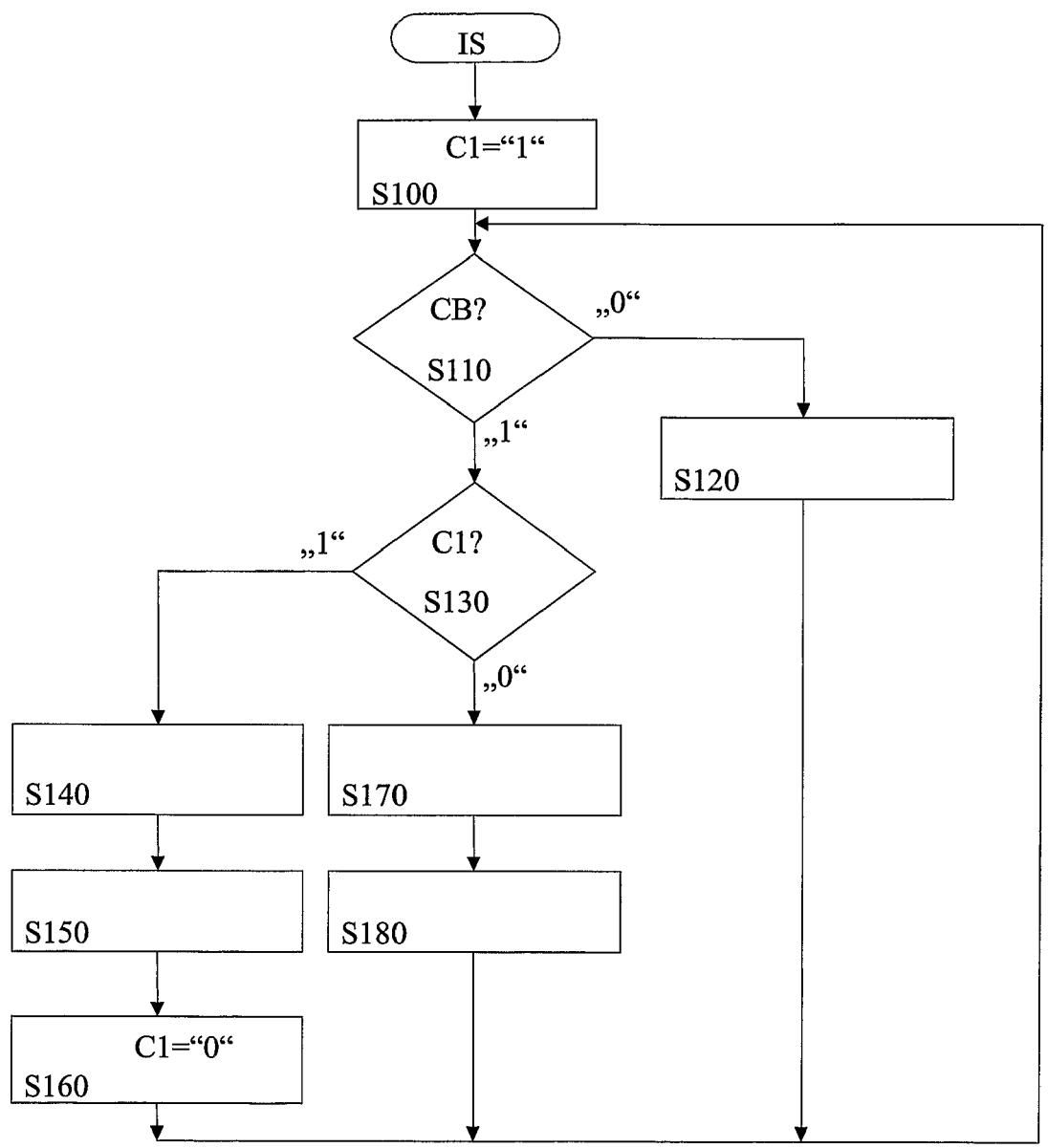
FIG. 3 shows a schematic flow diagram of a program memory fetch operation according to a first preferred embodiment.

FIG. 3 shows a schematic flow diagram of a program memory fetch operation, according to the first preferred embodiment, which may be preformed by the processor 40 of FIG. 1. Each time a new instruction word is fetched from the program memory 50, the processor 40 will follow the procedure described in FIG. 3 in order to correctly issue control or instruction words to the instruction decoder 44. In step S100, a parameter C1 indicating the first cycle of the fetch operation is set to "1" which corresponds to the logical value "true". Then, the content of the control information or control bit CB is checked in step S110. If a conventional instruction format is determined, as specified by the value "0" of the control information CB, a conventional non-compressed instruction word is determined and all 32 bits of the instruction word are issued directly to the instruction decoder 44 in step S120. On the other hand, if the control information CB is determined to be set to the value "1", which indicates a compressed instruction word, the value of the cycle parameter C1 is checked in step S130. If the cycle parameter C1 is set to "1" and thus indicates the first cycle, the lower individual instruction is selected and a NOP instruction is added in step S140. Then, this first decompressed instruction word is issued in step S150 and the cycle parameter C1 is set to "0" in step 160, which indicates the logical value "false".

Thereafter, the procedure returns to step S110. If it is then determined in step S130 that the cycle parameter is set to "0" and thus indicates the second cycle, the higher individual instruction of the present instruction word is selected and a NOP instruction is added in step S170. The decompressed instruction word is then issued as the second sequential instruction word in step S180.

It is noted that the term "lower individual instruction" indicates the instruction at the lower significant bit positions, while the term "higher individual instruction" indicates the instruction at the higher significant bit positions.

Figure 4:
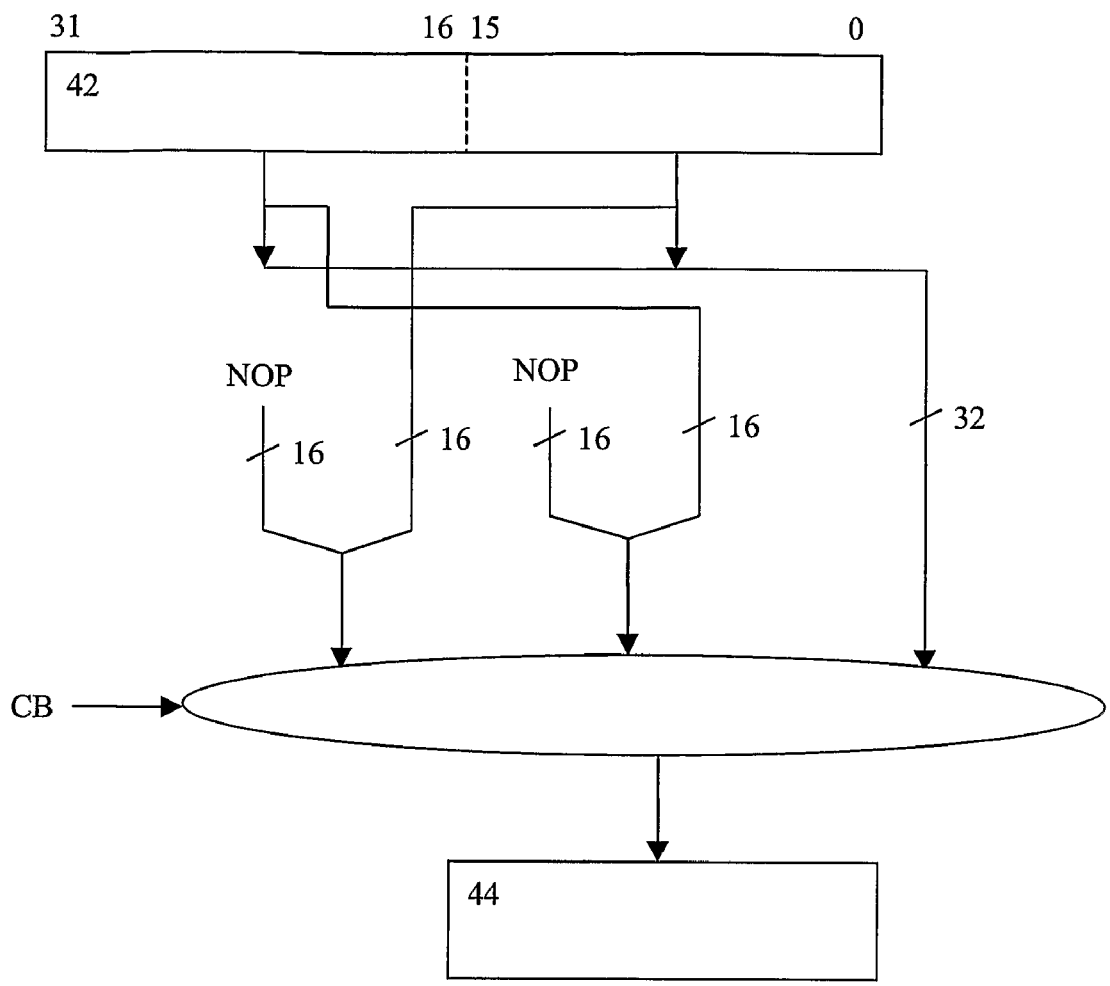
FIG. 4 shows a schematic diagram of an implementation of an instruction issue steering logic according to the first preferred embodiment.

FIG. 4 shows a schematic diagram indicating an example of a suitable implementation of an instruction issue steering logic based on the flow diagram of FIG. 3. This steering logic is based on the first predetermined example where the instruction word comprises two individual instructions, i.e. a lower instruction covering bit Nos. 0 to 15 and a higher instruction covering bit Nos. 16 to 31. In FIG. 4, a logical flow of information from the instruction register 42 to the instruction decoder 44 is shown. Based on the value of the control information CB, one of three combinations comprising at least one of the higher and lower individual instructions are supplied to the instruction decoder 44. In particular, a non-compressed instruction pattern is determined and supplied as one instruction word in one cycle to the instruction decoder 44 if the control information added as new MSB at bit position 32 is set to "0".

On the other hand, if the control information CB is set to "1", two decompressed instruction words are sequentially supplied in two cycles to the instruction decoder 44. In the first cycle, the lower individual instruction is combined with a NOP operation at the higher bit positions and the combined decompressed instruction word is supplied to the instruction decoder 44. In the second cycle, the higher individual instruction is combined as a lower instruction with a second NOP operation again at the higher bit positions to form the sequential second decompressed instruction word. This second decompressed instruction word is also supplied to the instruction decoder 44.

In general, according to the preferred embodiments, n instructions can be compressed by packing n individual instructions into one physical memory word or instruction word. In the first and second preferred embodiments, n=2 and n=3, respectively. Therefore, no extra pipelines stages are needed. In contrast thereto, conventional compression techniques as described initially, process the instruction word so as to loose its alignment so that extra pipeline stages are used to re-align and expand the extraction words issued down the pipeline to the instruction decoder.

According to the preferred embodiments, groupings of compressed individual instructions are aligned with physical program memory words by using predetermined extraction patterns. Thereby, power is saved by having smaller memory space, and program memory access band width is reduced due to the fact that only one instruction fetch is needed for two or more instruction issues.

Figure 5:
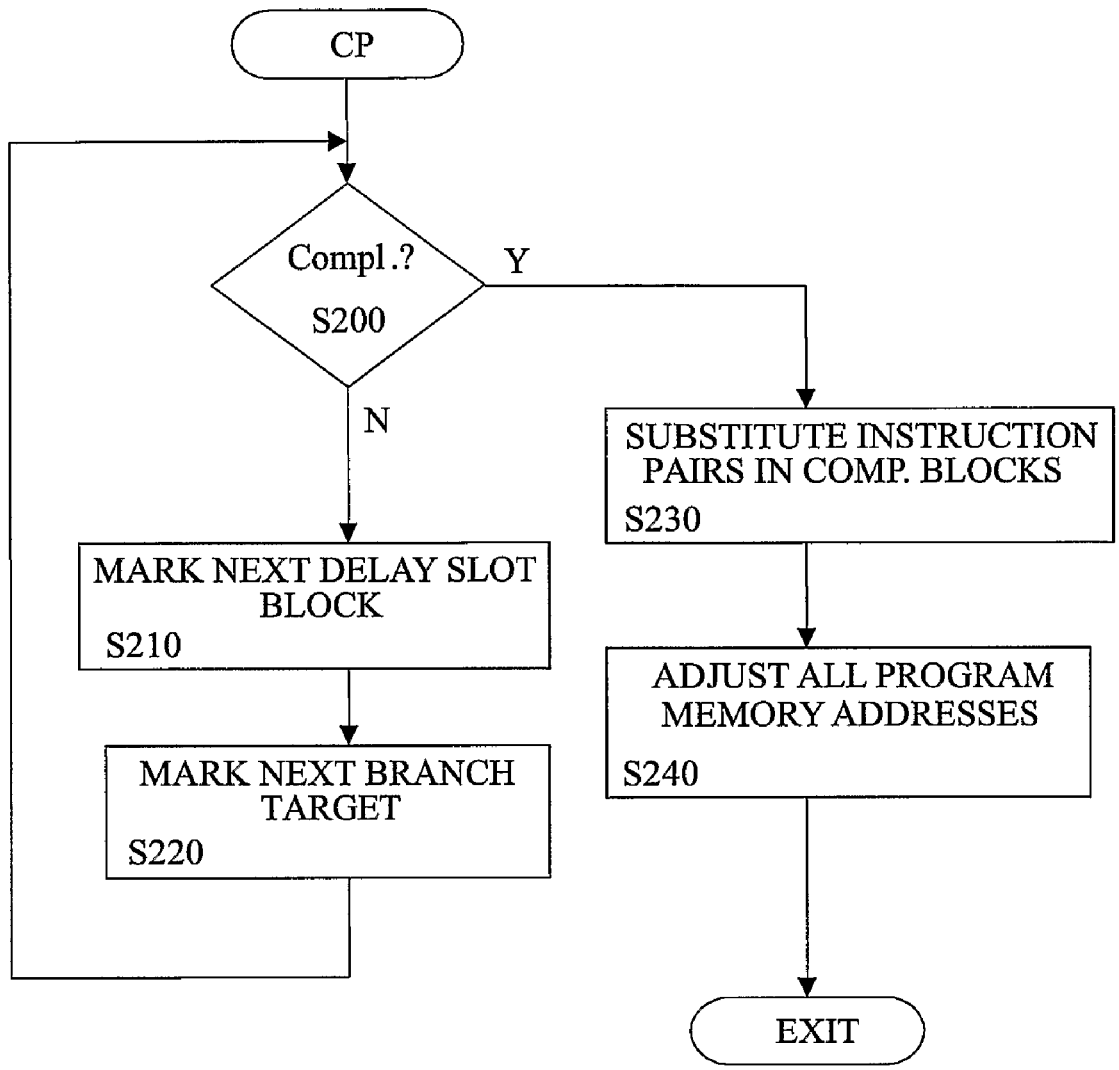
FIG. 5 shows a schematic flow diagram of a compaction scheme according to the first preferred embodiment.

FIG. 5 shows a schematic flow diagram of a compaction or compression scheme according to the first preferred embodiment. This procedure may be carried out by a compiler, assembler and/or linker function of the processor 40 and supports the programmer's software tool flow in a number of ways. Delay slots must be treated in pairs and must have no branch targets within them. A branch target must always be regarded as breaking up the pairing of suitable compaction or compression candidates, such that compression will only be performed on valid pairs including the potential control flow entry presented by the branch target.

In step S200 it is checked whether a complete program has been processed by the procedure. If not, a next delay slot block, i.e. a pattern comprising a NOP instruction, is marked in step S210. Then, a next branch target is marked in step S220 and the procedure returns to step S200. This loop is repeated until the procedure has marked all instructions that are associated with delay instructions and branch targets. When it is determined in step S200 that the complete program has been processed, instruction pairs of the predetermined patterns are substituted or replaced by compressed blocks or instruction words in step S230. Finally, in step S240, all program memory addresses are adjusted based on the merging of individual instruction words to compressed instruction words. Valid pairs can be instructed in step S230 by considering contiguous regions of adjacent instruction patterns, such as "NOP||mem" patterns.

The address adjustment in step 240 can be preformed by a post-processing stage to recompute all flow control target addresses due to the fact that the "height" of the program space has been reduced by the compression. Furthermore, the proposed compression scheme can be enhanced by biasing internal metrics for code selection within the scheduler e.g. of the compiler function so as to favor the selected predetermined patterns, e.g. "NOP||mem" patterns, in sequence and thus widening scope for identifying valid compression candidates.

The proposed compression scheme is fully transparent to the user of e.g. C compilers for digital signal processors and all stages are processed automatically. An assembly language programmer may manually seek compaction candidates while others stages, such as correct flow target address solution, are preformed automatically. In either way of code generation, the ISS (Instruction Set Simulator) will correctly simulate the behavior of this instruction class accurate level.

In summary, a parallel processing apparatus and an instruction processing scheme are proposed, wherein a first individual instruction extracted from a first instruction word and at least a second individual instruction extracted from at least subsequent second instruction word are processed as a new single instruction word. Thereby, at least two sequential operations can be defined in one instruction word which is treated by the instruction pipeline as if the two original instructions where issued. This can be achieved by expanding the compressed instruction format to add removed delay instructions.

It is noted that the present invention is not restricted to the above preferred embodiments but can be applied to any parallel processing device controlled by instructions words having a several individual instructions. Specifically, the invention can be also applied in non-VLIW machines. The proposed compression scheme can be implemented by any general-purpose computer operating in accordance with a computer program. This computer program may be carried by any suitable carrier medium such as a storage medium, i.e. floppy disk or CD ROM, or a carrier signal. Such a carrier signal could be a signal downloaded via a communications network such as the Internet. The appended computer program product claims are to be interpreted as covering a computer program provided in any of the above mentioned forms. The parallel processing apparatus proposed in the present invention may be included as a processor core in a highly integrated environment for use in multimedia applications, network routers, video mobile phones, intelligent automobiles, digital television, voice recognition, games, signal processing applications, etc. The embodiments may thus vary within the scope of the attached claims.

The invention claimed is:

1. A parallel processing apparatus for processing data based on instruction words comprising at least two individual instructions used for controlling at least two respective functional units, said apparatus comprising:
    an instruction processor arranged to process a first individual instruction extracted from a first instruction word, and at least a second individual instruction extracted from at least a subsequent second instruction word, as a new single instruction word, the instruction processor further arranged to add predetermined control information to said single instruction word, said control information indicating an allocation of said extracted first and at least second individual instructions to said respective functional units and a sequential order of said first and at least second individual instructions at their respective functional units; and
    a program memory arranged to store said single instruction word.

2. An apparatus according to claim 1, wherein said instruction processor is arranged to extract said first and at least second individual instructions if said first and at least second instruction words each comprise one of predetermined instruction patterns with at least one delay instruction, and to compress said first and at least second instruction words into said single instruction word.

3. An apparatus according to claim 2, wherein said delay instruction is a null operation.

4. An apparatus according to claim 1, wherein said control information includes at least one bit added as at least one respective most significant bit to said single instruction word.

5. An apparatus according to claim 1, wherein said instruction processor arranged to check said control information in an instruction word read from a program memory to re-establish said first and at least second instruction words based on said control information, and to supply said re-established first and at least second instruction words to an instruction decoder.

6. An apparatus according to claim 1, wherein said instruction processor is arranged to mark all instruction words associated with delay slots and branch targets, and to decide on extraction of said first and at least second individual instructions based on the markings.

7. An apparatus according to claim 6, wherein said instruction processing is arranged to adjust at least one program memory address based on a decided extraction.

8. An apparatus according to claim 1, wherein said parallel processing apparatus is a VLIW processor.

9. A method of compressing instruction words each comprising at least two individual instructions used for controlling at least two respective functional units, said method comprising the steps of:
    extracting a first individual instruction from a first instruction word;
    extracting at least a second individual instruction from at least one subsequent second instruction word;
    generating from said first and second individual instructions a new single instruction word;
    adding predetermined control information to said single instruction word, said control information indicating an allocation of the extracted first and at least second individual instructions to said respective functional units and a sequential order of the first and at least second individual instructions at their respective functional units; and
    storing said single instruction word.

10. A computer readable storage medium storing executable instructions which, when loaded into a computer, cause the computer to perform the steps of a compression method according to claim 9.

11. An apparatus according to claim 1, wherein said new single instruction word further includes a third individual instruction extracted from a subsequent third instruction word.

12. An apparatus according to claim 11, wherein the predetermined control information of the new single instruction word further indicates at least one of a functional unit allocation of the extracted third individual instruction and a sequential order of the third individual instruction at an associated functional unit.

13. A method according to claim 9, wherein the added control information further includes at least one bit added as at least one respective most significant bit to said single instruction word.

14. A method according to claim 9, further comprising:
    reading the stored single instruction word;
    checking said control information in the read single instruction word;
    re-establishing said first and at least second instruction words based on said control information; and
    decoding said re-established first and at least second instruction words.

* * * * *